United States Patent [19]

Dieck et al.

[11] 4,108,805

[45] Aug. 22, 1978

[54] STRUCTURALLY REGULATED POLYPHOSPHAZENE COPOLYMERS

[75] Inventors: Ronald L. Dieck, Evansville, Ind.; Edwin J. Quinn, Lancaster, Pa.

[73] Assignee: Armstrong Cork Company, Lancaster, Pa.

[21] Appl. No.: 830,692

[22] Filed: Sep. 6, 1977

[51] Int. Cl.² ............................................. C08G 79/02
[52] U.S. Cl. ................................... 521/180; 521/50; 528/169
[58] Field of Search ............. 260/2.5 R, 2 P, 2.5 FR, 260/47 P

[56] References Cited

U.S. PATENT DOCUMENTS

| | | | |
|---|---|---|---|
| 4,026,838 | 5/1977 | Dieck et al. | 260/2.5 FP |
| 4,053,456 | 10/1977 | Dieck et al. | 260/47 P |
| 4,055,520 | 10/1977 | Dieck et al. | 260/2.5 R |
| 4,055,523 | 10/1977 | Dieck et al. | 260/2.5 R |

*Primary Examiner*—Lester L. Lee
*Attorney, Agent, or Firm*—Richard J. Hammond

[57] ABSTRACT

This invention relates to polyphosphazenes which have an at least partially regulated structure corresponding to the formula:

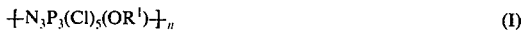

(I)

where $n$ is greater than 2, and where $R^1$ is phenyl or substituted phenyl. This invention further relates to copolymers, derived from the above polymers (I), which correspond to the formula:

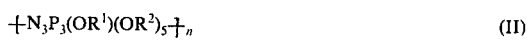

(II)

where $R^1$ is phenyl or substituted phenyl and where $R^2$ is different than $R^1$ and is an alkyl or substituted alkyl radical or a phenyl or substituted phenyl radical.

These polymers are prepared by polymerizing cyclic triphosphazenes of the formula:

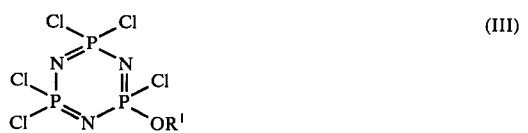

(III)

to form the polymers (I) which, in turn, are reacted to replace the chlorine with organic radicals to form polymers (II).

The polymers (II) can be formed by chemical blowing agents to form fire retardant articles. These polymers have fire retardant properties and evolve little or no smoke when exposed to an open flame.

21 Claims, No Drawings

STRUCTURALLY REGULATED POLYPHOSPHAZENE COPOLYMERS

STATE OF THE ART

A number of polyphosphazene copolymers are known in the art, but they are all characterized by the presence of random repeating units which can be characterized by the random structures:

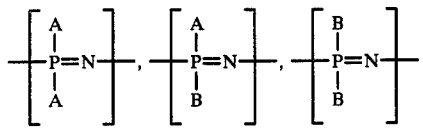

where A and B are different. A number of such copolymers are described in U.S. Pat. Nos. 3,271,330; 3,370,020; 3,370,026; 3,443,913; 3,515,688; 3,700,629; 3,702,833; 3,732,175; 3,844,983; 3,856,712; 3,856,713; 3,869,058; 3,883,451; 3,888,799; and 3,888,800.

Attempts have been made in the prior art to polymerize the cyclic compounds $N_3P_3(OC_6H_5)_6$ and $N_3P_3(C_6H_5)_6$ without success (see Allcock, "Phosphorous-Nitrogen Compounds", Academic Press, 1972, pgs. 323–328). The polymerization of $N_3P_3F_5C_6H_5$ has been accomplished (see Allcock et al, *Macromolecules*, 8 337, 1975).

The polymers (I) of the present invention vary markedly from the polymer $[NPCl_2]_n$ (see Allcock et al, U.S. Pat. No. 3,370,020), in that one out of every three repeating units is a $\text{-}NPCl(OR^1)\text{-}$ unit rather than a $\text{-}NPCl_2\text{-}$ unit. Likewise, the polymer (II) has a regularly occurring $\text{-}NP(OR^1)(OR^2)\text{-}$ unit, as opposed to the totally random distribution in the prior art copolymers.

DESCRIPTION OF THE INVENTION

It has now been discovered that cyclic polyphosphazenes of the formula:

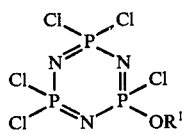

where $R^1$ is

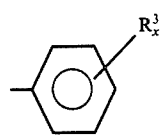

when $R^3$s, when present, are located in the meta or para positions on the phenoxy ring, where $x$ is 0 to 3; preferably 0 to 1 (where $x$ is 1, $R_3$ preferably is in the para position); and where $R_3$ is independently, lower (e.g., $C_1$–$C_{10}$) linear or branched alkyl, such as methyl, ethyl, n-butyl, sec. butyl or tert. butyl, 2-ethyl hexyl and n-nonyl; lower (e.g., $C_1$–$C_4$) linear or branched alkoxy, such as methoxy, ethoxy, butoxy; halo (e.g., chloro, bromo or fluoro), cyano, or nitro, or substituted alkyl or alkoxy (e.g., nitro, cyano, halo or lower alkoxy) can be polymerized to form polymers having repeating units corresponding to the formula:

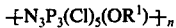

where $n$ is greater than about 2 to about 600 or higher and where $R^1$ is defined as above.

While prior art phosphazene polymers and copolymers are noted for their very broad range of molecular dispersity, surprisingly, the stereoregular copolymeric materials produced in accordance with the present invention (polymers (I) and (II) below) have a very low order of polydispersity, e.g., $\overline{M}w/\overline{M}n$, such being from about 5 to about 12. As a result, when compared to prior art random polymers, these polyphosphazenes display enhanced physical properties such as lower modulus and better elastomeric character. They also form clear and transparent films compared to the random prior art polyphosphazenes of brittle, opaque film character.

The polymers (I) can be further reacted to form homopolymers or copolymers having repeating units corresponding to the formula:

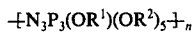

where $n$ and $R^1$ are defined as above and where $R^2$ is the same as $R^1$ or is different than $R^1$ and is lower (e.g., $C_1$–$C_{10}$) linear or branched alkyl, lower alkaryl, substituted lower alkyl, such as lower alkoxy, halo, cyano or nitro substituted alkyl or

where $R^4$s, when present, are substituted on any sterically permissible position on the phenoxy ring, preferably meta and para, where $z$ is 0 to 3; preferably 0 to 1; (where $z$ is 1, $R_4$ preferably is in the para position) and where $R_4$ is independently, lower linear or branched alkyl, lower linear or branched alkoxy, halo (e.g., chlorine, bromine or fluorine), nitro, cyano, or substituted alkyl or alkoxyl (e.g., nitro, cyano, halo or lower alkoxy substituted).

Examples of $OR^2$ include methoxy, ethoxy, propoxy n-butoxy, sec. butoxy, tert. butoxy, octyl, phenoxy, tolyloxy, xylyloxy, benzyl, phenethyloxy, chloro, bromo, methoxyphenoxy, propoxyphenoxy, p-nitrophenoxy, $OCH_2CF_3$, $OCH_2C_3F_7$, $OCH_2C_3F_6CF_2H$, 2,2,33-tetrafluoropropoxy, 3,4-dichlorophenoxy, 4-bromophenoxy, 2-chloroethylphenoxy, 2-chloroethoxyphenoxy and the like.

It is to be understood that while it is presently preferred that all $R^1$s are the same and all $R^2$s are the same, the $R^1$ can be mixed and the $R^2$ can be mixed. The mixtures may be mixtures of different substituents or mixtures of different positional isomers. In preparing specific polymers steric hindrance must be considered. For example, one skilled in the art readily will recognize that steric hindrance will dictate the propriety of using relatively bulky groups in the ortho-position on the phenoxy ring since as set forth hereinafter the $R^2$ is provided by reacting a substituted metal phenoxide with a chlorine atom on a phosphorus atom. Desirably, groups which sterically inhibit such a substitution reaction should be avoided. Absent the foregoing proviso, the selection of the various $R^2$s will be apparent to anyone skilled in the art based upon this disclosure.

The repeating units of the polymer (II) can be represented by the formulas:

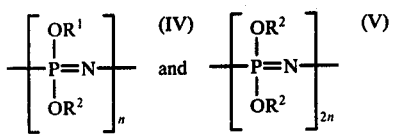

where the ratio of unit (IV) to unit (V) is 1:2, since the repeating unit is derived from ring opening of the triphosphazene (III). For example, typical polymer segments would be one or more of

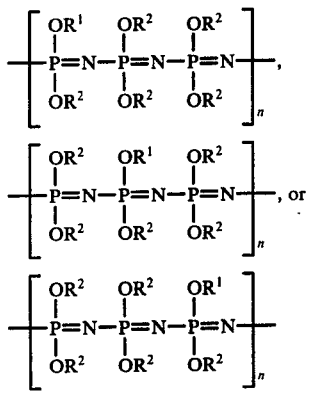

The above described polymers (II), as well as those containing reactive sites designated as W below, may be crosslinked and/or cured at moderate temperatures (for example, 200°–350° F.) by the use of free radical initiators, for example, peroxides, using conventional amounts, techniques and processing equipment.

The copolymers of this invention may contain small amounts of substituents W, which randomly replace a portion of the —$OR^2$ groups, i.e., units such as

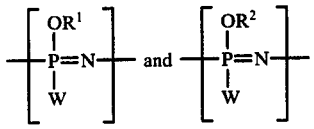

where W represents a group capable of a crosslinking chemical reaction such as an olefinically unsaturated, preferably ethylenically unsaturated monovalent radical containing a group capable of further reaction at relatively moderate temperatures, the ratio of W:$R^1$+$R^2$ being less than about 1:5. Examples of W are —OCH=$CH_2$; —$OR_5$CH=$CH_1$; —O-C($R_6$)=$CH_2$; —$OR_5$CF=$CF_2$ and similar groups which contain unsaturation, where $R_5$ and $R_6$ are aliphatic or aromatic radical, preferably $R_6$ is —$CH_2$—. These groups are capable of further reaction at moderate temperatures (for example, 200°–350° F.) in the presence of free radical initiators, conventional sulfur curing or vulcanizing additives known in the rubber art or other reagents, often even in the absence of accelerators, using conventional techniques and processing equipment. Examples of free radical initiatiors include benzoyl peroxide, bis(2,4-dichlorobenzoyl peroxide), di-tert-butyl peroxide, dicumyl peroxide, 2,5-dimethyl(2,5-di-tert-butylperoxy)hexane, t-butyl perbenzoate, 2,5-dimethyl-2,5-di(tert-butylperoxy) hepyne-3, and 1,1-bis(tert-butylperoxy)-3,3,5-trimethylcyclohexane. Thus, the general peroxide classes which may be used for crosslinking include diacyl peroxides, peroxyesters, and dialkyl peroxides.

Examples of sulfur-type curing systems include vulcanizing agents such as sulfur, sulfur monochloride, selenium, tellurium, thiuram disulfides, p-quinone dioximes, polysulfide polymers, and alkyl phenol sulfides. The above vulcanizing agents may be used in conjunction with accelerators, such as aldehyde amines, thio carbamates, thiuram sulfides, guanidines, and thiazols, and accelerator activators, such as zinc oxide or fatty acids, e.g., stearic acid.

It is also possible to use as W in the above formulas, monovalent radicals represented by the formulas (1) —OSi($OR^7$)$_2$$R^8$ and other similar radicals which contain one or more reactive groups attached to silicon; (2) —$OR^9$$NR^9$H and other radicals which contain reactive —NH linkages. In these radicals $R^7$, $R^8$, and $R^9$ each represent aliphatic, aromatic and acyl radicals. Like the groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. Nos. 3,888,799; 3,702,833; and 3,844,983, which are hereby incorporated by reference.

The amount of W present in the copolymer affects the processability, smoke production, glass transition temperature and a number of other properties of the copolymers. These ratios also affect the copolymer's ability to be foamed and the properties, such as rigidity, of the resulting foams.

The cyclic polyphosphazenes (III) can be prepared, for example, by following the general reaction scheme taught by Dell et al, "Phosphorus Nitrogen Compounds Part XIII Phenoxy and p-Bromophenoxy-Chlorocyclotriphosphazatrienes", J. Chem. Soc. (1965) 4070–4073.

Generally, the procedure comprises forming the sodium salt of the desired phenolic compound (HO$R^1$, where $R^1$ is defined as above) in a suitable solvent such as tetrahydrofuran or dioxane. This phenoxide is then slowly added to the trimer, hexachlorocyclotriphosphazene in a suitable solvent, as above, the reaction being conducted at low temperatures to retard side reactions. The use of significant amounts of solvent also promotes a uniform product. The product is then isolated. In a preferred isolation technique, a water immiscible solvent is substituted for the reaction solvent and the solution is washed seriatim with dilute acid, dilute base and water to remove unreacted starting materials and byproducts. The organic layer is then vacuum distilled.

There follows several examples showing the preparation of cyclic phosphazenes (III).

EXAMPLE 1

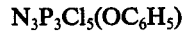

Sodium phenoxide was formed by reacting 8.0 parts of sodium with 44.0 parts of phenol in 1800 parts of tetrahydrofuran.

120.0 parts of hexachlorocyclotriphosphazene was charged into a reactor together with 1000 parts of tetrahydrofuran and the mixture cooled to −78° C. To the stirred reactor, there was then added dropwise, over a 3 hour period, the previously prepared sodium phenoxide solution, while maintaining the temperature at −78° C.

until the addition was complete. The reaction mixture was then allowed to warm to room temperature.

The reaction mixture was then worked up in the following manner: The solvent was evaporated and the resultant oil was dissolved in petroleum ether. The ether solution was washed with 5% aqueous hydrochloric acid, then 5% aqueous sodium bicarbonate, followed by several washings with water. The petroleum ether was then evaporated and the resultant oil was vacuum distilled to obtain phenoxypentachlorocyclotriphosphazene (b.p. 74° C. at 0.07 Torr).

Elemental Analysis: Theoretical — C, 17.78; H, 1.24; N, 10.37; P, 22.93. Found — C, 17.65; H, 1.24; N, 10.44; P, 22.88.

EXAMPLE 2

Sodium p-fluorophenoxide was formed by reacting 4 parts of sodium with 26.9 parts of p-fluorophenol in 900 parts of tetrahydrofuran.

60 parts of hexachlorocyclotriphosphazene were charged into a reactor together with 500 parts of tetrahydrofuran, and the mixture cooled at −78° C. The previously prepared sodium p-fluorophenoxide solution was added dropwise and reacted as in Example 1. The resultant product was worked up as in Example 1 to yield p-fluorophenoxypentachlorocyclotriphosphazene (b.p. 107° C at 0.02 Torr).

Elemental Analysis: Theoretical — C, 17.02; H, 0.95; N, 9.93; P, 21.94. Found — C, 17.36; H, 1.00; N, 9.86; P, 21.85.

EXAMPLE 3

$N_3P_3Cl_5(OC_6H_5\text{-p-Cl})$

Using sodium p-chlorophenoxide, p-chlorophenoxypentachlorocyclotriphosphazene was prepared following the procedure of Example 1 (b.p. 126° C. at 0.25 Torr).

Elemental Analysis: Theoretical — C, 16.39; H, 0.90; N, 9.56; P, 21.13. Found — C, 16.34; H, 0.82; N, 9.42; P, 21.05.

EXAMPLE 4

Using sodium p-methylphenoxide, p-methylphenoxypentachlorocyclotriphosphazene is prepared following the procedure of Example 1 (b.p. 130° C. at 0.05 Torr).

Elemental Analysis: Theoretical — C, 20.05; H, 1.68; N, 10.02; P, 22.16. Found — C, 20.18; H, 1.69; N, 10.08; P, 22.09.

EXAMPLE 5

Using sodium p-methoxyphenoxide, p-methoxyphenoxypentachlorocyclotriphosphazene was prepared following the procedure of Example 1 (b.p. 121° C. at 0.025 Torr).

Elemental Analysis: Theoretical — C, 19.31; H, 1.62; N, 9.65; P, 21.34. Found — C, 19.58; H, 1.79; N, 9.67; P, 21.43.

In a manner similar to the above teachings or using variants obvious to those skilled in the art, other cyclic trimers (III) can be prepared.

The polymers (I) are prepared by thermally polymerizing the cyclic triphosphazines by heating them at a temperature and for a length of time ranging from about 200° C. for 72 hours to 300° C. for 30 minutes. That is to say the compounds are heated to a temperature ranging from about 200° C. to about 300° C. for from about 30 minutes to 72 hours, the higher temperatures necessitating shorter contact times and the lower temperatures necessitating longer contact times. The compounds must be heated for such a length of time that only a minor amount of unreacted charge material remains and a major amount of high polymer has been produced. Such a result is generally achieved by following the conditions of temperature and contact time specified above.

It is preferred that the thermal polymerization be carried out in the presence of an inert gas such as nitrogen, neon, argon or a vacuum, for example, about $10^{-2}$ Torr, inasmuch as the reaction proceeds very slowly in the presence of air. The use of such as gas, however, is not critical. The presence of moisture is also preferably avoided.

The polymerization process follows that taught for the polymerization of —NPCl$_2$—$_3$, as described in U.S. Pat. No. 3,370,020 which is incorporated by reference.

The polymers resulting from the thermal polymerization process are in the form of a polymeric mixture of different polymers of different chain lengths. That is to say, the product of the thermal polymerization is a mixture of polymers having the formula (I)

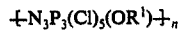

where n ranges from about 2 to about 600 or higher. For example, the recovered media may contain minor amounts of a polymer where n is 2 and major amounts of polymer where n is 600 or higher. The media may also contain polymers composed of from 3–599 or higher recurring units, the complete mixture of polymers may constitute the starting material for forming the polymer (II).

The polymers (I) exhibit excellent elastomeric properties but display instability to atmospheric moisture.

There follows several examples of the preparation of polymers (I). These examples, as is true of all the examples herein, are exemplary and are not to be construed as limiting.

EXAMPLE 6

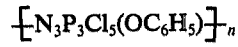

A quantity of the trimer of Example 1 was deoxygenated with inert gas and sealed in a suitable, thick-walled reaction vessel at $10^{-2}$ Torr and heated at 250° C. for 15 hours. Polymerization was terminated at this time since a glass ball, one-half inch in diameter, ceased to flow due to the increased viscosity of the molten mass, when the vessel was inverted termination was effected by cooling the vessel to room temperature. The resultant polymer had a Tg of −49.1° C.

Elemental Analysis: Found (%) — C, 17.62; H, 1.20; N, 10.28; P, 23.12.

EXAMPLE 7

In the same manner as Example 6, the trimer of Example 2 was thermally polymerized at 250° C. for 8 hours. The resultant polymer had a Tg of −47.6° C.

EXAMPLE 8

$\{N_3P_3Cl_5(OC_6H_4\text{-p-Cl})\}_n$

In the same manner as Example 6, the trimer of Example 3 was thermally polymerized at 250° C. for 10 hours. The resultant polymer had a Tg of −39.3° C.

Elemental Analysis: Found — C, 16.29; H, 0.82; N, 9.49; P, 21.05.

EXAMPLE 9

$\{N_3P_3Cl_5(OC_6H_4\text{-p-CH}_3)\}_n$

In the same manner as Example 6, the trimer of Example 4 was thermally polymerized at 250° C. for 18 hours. The resultant polymer had a Tg of −44.2° C.

EXAMPLE 10

$\{N_3P_3Cl_5(OC_6H_4\text{-p-OCH}_3)\}_n$

In the same manner as Example 6, the trimer of Example 5 was thermally polymerized at 250° C. for 6 hours. The resultant polymer had a Tg of −43.7° C.

The polymers (II) are formed in a process which comprises treating the polymer mixture (I) resulting from the thermal polymerization step with a mixture of compounds having the formulas $$M(OR^2)_v$$

and, if desired, $$M(W)_v$$

wherein M is lithium, potassium, magnesium or calcium, $v$ is equal to the valence of metal M, and $-OR^2$ and W are as specified above.

The polymer mixture is reacted with the mixture of metal compounds at a temperature and a length of time ranging from about 25° C. for 7 days to about 200° C. for 3 hours.

Again, as in regard to the polymerization step mentioned above, the polymer mixture is reacted with the alkali or alkaline earth metal compounds at a temperature ranging from about 25° C. to about 200° C. for from about 3 hours to 7 days, the lower temperatures necessitating the longer reaction times and the higher temperatures allowing shorter reaction times. These conditions are, of course, utilized in order to obtain the most complete reaction possible, i.e., in order to insure the complete conversion of the chlorine atoms in the polymer mixture to the corresponding ester of the alkali or alkaline earth starting materials.

The above esterification step is carried out in the presence of a solvent. The solvent employed in the esterification step must have a relatively high boiling point (e.g., about 115° C. or higher) and should be a solvent for both the polymer and the alkali or alkaline earth metal compounds. In addition, the solvent must be substantially anhydrous, i.e., there must be no more water in the solvent or metal compounds than will result in more than 1%, by weight, of water in the reaction mixture. The prevention of water in the system is necessary in order to inhibit the reaction of the available chlorine atoms in the polymer therewith. Examples of suitable solvents include diglyme, triglyme, tetraglyme, toluene and xylene. The amount of solvent employed is not critical, and any amount sufficient to solubilize the chloride polymer mixture can be employed. Either the polymer mixture or the alkaline earth (or alkali) metal compounds may be used as a solvent solution thereof in an inert, organic solvent. It is preferred, however, that at least one of the charge materials be used as a solution in a compound which is a solvent for the polymeric mixture.

The amount of alkali metal or alkaline earth metal compound or compounds employed should be at least about stoichiometrically equivalent to the number of available chlorine atoms in the polymer mixture. However, it is preferred that an excess of the metal compound be employed in order to assume complete reaction of all the available chlorine atoms. Where a mixture of metal compounds is employed, generally, the ratio of the individual alkali metal or alkaline earth metal compounds in the combined mixture governs the ratio of the groups attached to the polymer backbone. However, those skilled in the art readily will appreciate that the nature and, more particularly, the steric configuration of the metal compounds employed may effect their relative reactivity. Accordingly, the ratio mixed $R_2$s in the esterified product, if necessary may be controlled by employing a stoichiometric excess of the slower reacting metal compound.

Examples of alkali or alkaline earth metal compounds which are useful in the process of the present invention include sodium phenoxide
potassium phenoxide
sodium p-methoxyphenoxide
sodium-o-methoxyphenoxide
sodium-m-methoxyphenoxide
lithium p-methoxyphenoxide
lithium o-methoxyphenoxide
lithium m-methoxyphenoxide
potassium p-methoxyphenoxide
potassium o-methoxyphenoxide
potassium m-methoxyphenoxide
magnesium p-methoxyphenoxide
magnesium o-methoxyphenoxide
magnesium m-methoxyphenoxide
calcium p-methoxyphenoxide
calcium o-methoxyphenoxide
calcium m-methoxyphenoxide
sodium p-ethoxyphenoxide
sodium o-ethoxyphenoxide
sodium m-ethoxyphenoxide
potassium p-ethoxyphenoxide
potassium o-ethoxyphenoxide
potassium m-ethoxyphenoxide
sodium p-n-butoxyphenoxide
sodium m-n-butoxyphenoxide
lithium p-n-butoxyphenoxide
lithium m-n-butoxyphenoxide
potassium p-n-butoxyphenoxide
potassium m-n-butoxyphenoxide
magnesium p-n-butoxyphenoxide
magnesium m-n-butoxyphenoxide
calcium p-n-butoxyphenoxide
calcium m-n-butoxyphenoxide
sodium p-n-propoxyphenoxide
sodium o-n-propoxyphenoxide
sodium m-n-propoxyphenoxide
potassium p-n-propoxyphenoxide
potassium o-n-propoxyphenoxide
potassium m-n-propoxyphenoxide
sodium p-methylphenoxide
sodium o-methylphenoxide sodium m-methylphenoxide
lithium p-methylphenoxide
lithium o-methylphenoxide
lithium m-methylphenoxide
sodium p-ethylphenoxide
sodium o-ethylphenoxide
sodium m-ethylphenoxide
potassium p-n-propylphenoxide
potassium o-n-propylphenoxide
potassium m-n-propylphenoxide
magnesium p-n-propylphenoxide
sodium p-isopropylphenoxide
sodium o-isopropylphenoxide
sodium m-isopropylphenoxide
calcium p-isopropylphenoxide
calcium o-isopropylphenoxide
calcium m-isopropylphenoxide
sodium p-sec butylphenoxide
sodium m-sec butylphenoxide
lithium p-sec butylphenoxide
lithium m-sec butylphenoxide
lithium p-tert. butylphenoxide
lithium m-tert. butylphenoxide
potassium p-tert. butylphenoxide
potassium m-tert. butylphenoxide
sodium p-tert. butylphenoxide
sodium m-tert. butylphenoxide
sodium propeneoxide
sodium p-nonylphenoxide
sodium m-nonylphenoxide
sodium o-nonylphenoxide
sodium 2-methyl-2-propeneoxide
potassium buteneoxide
and the like.

This process results in the production of a polymer mixture having the formula (II).

The polymeric reaction mixture resulting from this reaction or esterification step is then treated to remove the salt which results upon reaction of the chlorine atoms of the starting polymer mixture with the metal of the alkali or alkaline earth metal compounds. The salt can be removed by merely precipitating it out and filtering, or it may be removed by any other applicable method, such as by washing the reaction mixture with water after neutralization thereof with, for example, an acid such as hydrochloric acid.

The next step in the process comprises fractionally precipitating the polymeric material to separate out the high polymer from the low polymer and any unreacted trimer. The fractional precipitation is achieved by the, preferably dropwise, addition of the esterified polymer mixture to a material which is a non-solvent for the high polymer and a solvent for the low polymer and unreacted trimer. That is to say, any material which is a nonsolvent for the polymers wherein $n$ is higher than 350 and a solvent for the remaining low polymers may be used to fractionally precipitate the desired polymers. Examples of materials which can be used for this purpose include hexane, diethyl ether, carbon tetrachloride, chloroform, dioxane methanol, water and the like. The fractional precipitation of the esterified polymeric mixture generally should be carried out at least twice and preferably at least four times in order to remove as much of the low polymer from the polymer mixture as possible. The precipitation may be conducted at any temperature, however, it is preferred that room temperature be employed. The novel high molecular weight copolymer mixture may then be recovered by filtration, centrifugation, decantation or the like.

There follows several examples of the preparation of polymers (II).

EXAMPLE 11

An anhydrous toluene solution of the polymer formed in Example 6, containing 31.2 parts of the polymer, was added to an anhydrous diglyme-benzene solution of 53.9 parts of sodium phenoxide at a temperature of 95° C. with constant stirring. After the addition, benzene was distilled from the reaction mixture until a temperature of 115°–116° C. was attained. The reaction was then heated to reflux for 60–65 hours. At the end of this time, the resultant polymer was precipitated by pouring the reaction mixture into an excess of methyl alcohol. The polymer was stirred in the methyl alcohol for 24 hours. Next, the polymer was added to a large quantity of water and stirred an additional 24 hours. The polymer was then separated and dried. The resultant homopolymer was a semicrystalline solid having a glass transition temperature (Tg) of −4.76° C. The polymer was soluble in benzene, tetrahydrofuran (THF) and dimethylformamide (DMF). Films cast from THF were tough and opaque. The films did not burn and were water repellent.

Elemental Analysis: Theoretical — C, 62.34; H, 4.36; N, 6.06; P, 13.40. Found — C, 62.10; H, 4.36; N, 5.97; P, 13.69.

EXAMPLE 12

The procedure of Example 11 was followed, except that 15.0 parts of the polymer of Example 8 were reacted with 30.8 parts of sodium p-chlorophenoxide. The resultant homopolymer (79% yield) was a semicrystalline solid having a Tg of −1.54° C. The polymer was soluble in benzene, THF, DMF, and chloroform. Films cast from the THF were tough and opaque. The films did not burn and were water repellent.

Elemental Analysis: Theoretical — C, 48.18; H, 2.70; N, 4.68; P, 10.36. Found — C, 47.90; H, 2.63; N, 4.49; P, 10.28.

EXAMPLE 13

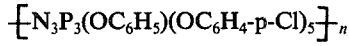

The procedure of Example 11 was followed, except that 16.5 parts of the polymer of Example 6 were reacted with 37.1 parts of sodium p-chlorophenoxide. The resultant copolymer (56% yield) was a solid soluble in benzene, THF and DMF. Films cast from THF were tough and opaque. The films did not burn and were water repellent.

Elemental Analysis: Theoretical — C, 64.48; H, 5.28; N, 5.50; P, 12.17. Found — C, 64.34; H, 5.22; N, 5.42; P, 12.30.

EXAMPLE 14

The procedure of Example 11 was followed, except that 14.1 parts of the polymer of Example 6 were reacted with 27.3 parts of sodium p-methylphenoxide. The resultant polymer (40% yield) was a solid, soluble in benzene, THF and DMF. Films cast from THF were tough and transparent. The films did not burn and were water repellent.

Elemental Analysis: Theoretical — C, 64.48; H, 5.28; N, 5.50; P, 12.17. Found — C, 64.34; H, 5.22; N, 5.42; P, 12.30.

EXAMPLE 15

$[N_3P_3(OC_6H_4\text{-p-F})(OC_6H_4\text{-p-CH}_3)_5]_n$

The procedure of Example 11 was followed, except that 18.9 parts of the polymer of Example 7 were reacted with 35.3 parts of sodium p-methylphenoxide. The resultant polymer (70% yield) was a solid with a Tg of +0.08° C., soluble in benzene, THF and DMF. Films, cast from THF, were tough and transparent, did not burn, and were water repellent.

Elemental Analysis: Theoretical — C, 63.00; H, 5.03; N, 5.37; P, 11.89. Found — C, 62.91; H, 5.18; N, 5.26; P, 12.01.

EXAMPLE 16

$[N_3P_3(OC_6H_4\text{-p-Cl})(OC_6H_4\text{-p-CH}_3)_5]_n$

The procedure of Example 11 was followed, except that 15.0 parts of the polymer of Example 8 were reacted with 26.6 parts of sodium p-methylphenoxide. The resultant polymer (72% yield) was a solid with a Tg of −3.65° C., soluble in benzene, THF and DMF. Films, cast from THF, were tough and transparent, did not burn and were water repellent.

Elemental Analysis: Theoretical — C, 61.93; H, 4.56; N, 5.28; P, 11.69. Found — C, 61.83, H, 4.72; N, 5.18; P, 11.52.

EXAMPLE 17

$[N_3P_3(OC_6H_4\text{-p-CH}_3)(OC_6H_4\text{-p-Cl})_5]_n$

The procedure of Example 11 was followed, except that 20.6 parts of the polymer of Example 9 were reacted with 44.1 parts of sodium p-chlorophenoxide. The resultant polymer (41% yield) was a solid with a Tg of +2.06° C., soluble in benzene, THF and DMF. Films, cast from THF, did not burn and were water repellent.

Elemental Analysis: Theoretical — C, 50.51; H, 3.09; N, 4.78; P, 10.56. Found — C, 50.32; H, 3.05; N, 4.77; P, 10.78.

EXAMPLE 18

$[N_3P_3(OC_6H_5)(OC_6H_4\text{-4-OCH}_3)_5]_n$

A solution of 15.5 parts of $[N_3P_3Cl_5(OC_6H_5)]_n$ polymer in 200 parts of anhydrous toluene was added over a 1.5 hour period to a stirred solution of sodium p-methoxyphenoxide at 90° C. The sodium aryloxide solution was prepared by the reaction of 28.3 parts of p-methoxyphenol with 5.1 parts of sodium in 300 parts of anhydrous bis-(2-methoxyethyl)-ether and 100 parts of dry benzene. After the addition, benzene was distilled until a temperature of 115°–116° C. was attained. The reaction mixture was then heated at 115°–116° C. for 60–70 hours with constant stirring. The polymer was precipitated into a large excess of methanol and washed in methanol for 24 hours. It was removed from the methanol, exhaustively washed with distilled water, and dried. The product is a colorless, stiff elastomer.

EXAMPLE 19

$[N_3P_3(OC_6H_5)(OC_6H_4\text{-4-Cl})_5]_n$

A solution of 16.5 g (0.205 equiv.) of $[N_3P_3Cl_5(OC_6H_5)]_n$ polymer in 300 ml of anhydrous toluene was added over a 1.5 hour period to a stirred solution of sodium p-chlorophenoxide at 90° C. The sodium aryloxide solution was prepared by the reaction of 31.6 g (0.246 mole) of p-chlorophenol with 5.6 g (0.241 mole) of sodium in 300 ml of anhydrous bis-(2-methoxyethyl)ether and 100 ml of dry benzene. After the addition, benzene was distilled until a temperature of 115°–116° C. was attained. The reaction mixture was then heated at 115°–116° C. for 60–70 hours with constant stirring. The polymer was precipitated into a large excess of methanol and washed in methanol for 24 hours. It was removed from the methanol, exhaustively washed with distilled water, and dried. The product is a colorless, fibrous material.

Following similar procedures, other homopolymers and copolymers, such as described above, can be prepared.

Films of the stereoregular polymers produced by the process of the present invention are compared with prior art random copolymers for illustrative purposes in the following table.

|  | Molecular Weight | Youngs Storage Modulus | Polydispersity | Film Character |
|---|---|---|---|---|
|  | Mw |  | Mw/Mn |  |
| A. Random Copolymer 1. Ring opening of hexachlorocyclotriphosphazene 2. Reaction of the product of step 1 with a 5:1 mixture of sodium p-chlorophenoxide-sodium phenoxide 3. Isolation of random copolymer poly(4-chlorophenoxy phenoxyphosphazene) | 1.64 × 10⁶ | 1.8 × 10¹⁰ dynes/cm² | 16.3 | Brittle, opaque |
| B. Stereoregular Copolymer 1. Ring opening of phenoxy pentachlorocyclotriphosphazene (Example 6) 2. Reaction of the product of step 1 with sodium p-chlorophenoxide 3. Isolation of stereoregular copolymer poly(4-chlorophenoxy phenoxyphosphazene) (Example 13) | 0.69 × 10⁶ | 1.3 × 10¹⁰ dynes/cm² | 7.0 | Transparent, colorless |

The novel polymers (II) of this invention, as mentioned above, are very thermally stable. The mixtures are soluble in specific organic solvents such as tetrahydrofuran, benzene, xylene, toluene, dimethylformamide and the like and can be formed into films from solutions of the copolymers by evaporation of the solvent. The polymers are water resistant at room temperature and do not undergo hydrolysis at high temperatures. The polymers may be used to prepare films, fibers, coatings, molding compositions, and the like. They may be blended with such additives as antioxidants, ultraviolet light absorbers, lubricants, plasticizers, dyes, pigments, fillers such as litharge, magnesia, calcium carbonate, furnace black, alumina trihydrate and hydrated silicas, other resins, etc., without detracting from the scope of the present invention.

The polymers may be used to prepare foamed products which exhibit excellent fire retardance and, in some cases, produce low smoke levels, or essentially no smoke when heated in an open flame. The foamed products may be prepared from filled or unfilled formulations using conventional foam techniques with chemical blowing agents, i.e., chemical compounds stable at original room temperature which decompose or interact at elevated temperatures to provide a cellular foam. Suitable chemical blowing agents include:

| Blowing Agent | Effective Temperature Range ° C. |
|---|---|
| Azobisisobutyronitrile | 105–120 |
| Azo dicarbonamide(1,1-azobisformamide) | 100–200 |
| Benzenesulfonyl hydrazide | 95–100 |
| N,N'-dinitroso-N,N'-dimethyl terephthalamide | |
| Dinitrosopentamethylenetetramine | 130–150 |
| Ammonium carbonate | 58 |
| p,p'-oxybis(benzenesulfonyl-hydrazide) | 100–200 |
| Diazoaminobenzene | 84 |
| Urea-biuret mixture | 90–140 |
| 2,2'-azo-isobutyronitrile | 90–140 |
| Azohexahydrobenzonitrile | 90–140 |
| Diisobutylene | 103 |
| 4,4'-diphenyl disulfonylazide | 110–130 |

Typical foamable formulations include:

| | |
|---|---|
| Phosphazene copolymer (e.g., $[N_3P_3(OC_6H_5)(OC_6H_4\text{-p-}OCH_3)_5]_n$ | 100 parts |
| Filler (e.g., alumina trihydrate) | 0–100 phr |
| Stabilizer (e.g., magnesium oxide) | 2.5–10 phr |
| Processing aid (e.g., zinc stearate) | 2.5–10 phr |
| Plasticizer resin (e.g., Cumar P-10 coumarone indene resin) | 0–50 phr |
| Blowing agent (e.g., 1,1'-azobisformamide) | 10–50 phr |
| Activator (e.g., oil-treated urea) | 10–40 phr |
| Peroxide curing agent (e.g, 2,5-dimethyl-2,5-di(t-butylperoxy) hexane) | 2.5–10 phr |
| Peroxide curing agent (e.g., benzoyl peroxide) | 2.5–10 phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a two-roller mill, preferably with one roll at ambient temperature and the other at moderately elevated temperature, for example, 100°–120° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy) hexane, and partially pre-curing in a closed mold for about 6–30 minutes at 200°–250° F., followed by free expansion for 30–60 minutes at 300°–350° F. In the alternative, the foaming may be accomplished by heating the foamable mass for 30–60 minutes at 300°–350° F. using a high temperature or low temperature curing agent, either singly or in combination. One benefit of utilizing the "partial pre-cure" foaming technique is that an increase in the molecular weight of the foamable polymer prior to the foaming step enables better control of pore size and pore uniformity in the foaming step. The extent of "pre-cure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the glass transition temperature of the copolymer employed in the foam formulation, that is to say, the lower the glass transition of the polymer, the more flexible will be the foam produced therefrom. As indicated, inert, reinforcing or other fillers such as alumina trihydrate, hydrated silicas or calcium carbonate can be added to the polymer foams and the presence of these and other conventional additives should in no way be construed as falling outside the scope of this invention.

EXAMPLE 20

Preparation of Foamed
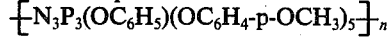

To 100 parts of the copolymer $\{N_3P_3(OC_6H_5)(OC_6H_4\text{-p-}OCH_3)_5\}$ prepared in accordance with Example 20, there were added 100 parts of alumina trihydrate, 5 parts of magnesium oxide, 5 parts of zinc stearate, 3 parts of CUMAR P-10 (a coumarone-indene resin), 30 parts of Celogen AZ (1,1'azobisformamide), 23 parts of BIK-OT (an oi-treated urea), 5 parts of 2,5-dimethyl-2,5-di(tert.-butylperoxy)hexane, and 5 parts of benzoyl peroxide (78% active, wet with water). The above ingredients were milled to insure homogeneous mixing of all materials. This mix was then free blown at 325°–350° F. for 10 minutes. The resultant flexible foam was light tan in color with a uniform small cellular structure. There was no evidence of delamination or side splits. A piece of the foamed material when heated in a Bunsen burner flame evolved only a very slight trace of smoke. The sample did not burn when removed from the burner flame. Thus, it would not support combustion and was rated as non-burning.

Also, as mentioned above, the polymers of this invention can be crosslinked at moderate temperatures by conventional free radical and/or sulfur curing techniques when minor amounts of unsaturated groups W are present in the polymer backbone. The ability of these polymers to be cured at temperatures below about 350° F. makes them particularly useful as potting and encapsulation compounds, sealants, coatings and the like. These polymers are also useful for preparing cross-linked foams which exhibit significantly increased tensile strengths over uncured foams. These polymers are often crosslinked in the presence of inert, reinforcing or other fillers and the presence of these and other conventional additives are deemed to be within the scope of this invention.

What is claimed is:

1. A structurally regulated polyphosphazene copolymer represented by the general formula

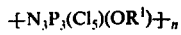

where $n$ is greater than 2 to about 600 and where $R^1$ represents

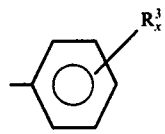

wherein $R^3$ is located in the meta or para positions on the phenoxy ring, and represents lower alkyl, lower alkoxy, halo, cyano, nitro, substituted lower alkyl or substituted lower alkoxy wherein the substituents are nitro, cyano, halo, or lower alkoxy and $x$ is 0 to 3.

2. A polyphosphazene, as in claim 1, where $R^1$ is phenyl.

3. A polyphosphazene, as in claim 1, where $R^3$ is lower alkyl or lower alkoxy, and where $x$ is 1.

4. A polyphosphazene, as in claim 3, where $R^3$ is located in the para position on the phenoxy ring.

5. A method of forming a structurally regulated polyphosphazene copolymer represented by the general formula

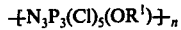

where $n$ is greater than about 2 to about 600 which method comprises polymerizing a triphosphazene corresponding to the formula

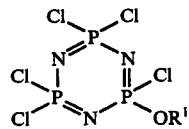

where $R^1$ represents

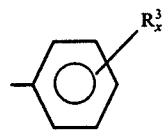

wherein $R^3$ is located in the meta or para positions on the phenoxy ring, and represents lower alkyl, lower alkoxy, halo, cyano, nitro, substituted lower alkyl or substituted lower alkoxy wherein the substituents are nitro, cyano, halo, or lower alkoxy and $x$ is 0 to 3.

6. A method, as in claim 5, where the triphosphazene is thermally polymerized in an inert atmosphere.

7. A method, as in claim 6, where $x$ is 0 or 1 and $OR^1$ is phenoxy, lower alkyl phenoxy, or lower alkoxyphenoxy.

8. A structurally regulated polyphosphazene copolymer represented by the general formula

where $n$ is greater than about 2 to about 600 and where $R^1$ represents

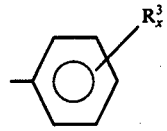

wherein $R^3$ is located in the meta or para positions on the phenoxy ring, and represents lower alkyl, lower alkoxy, halo, cyano, nitro, substituted lower alkyl or substituted lower alkoxy, and where $R^2$ and $R^1$ are different and represent lower alkyl, lower alkaryl, substituted lower alkyl or

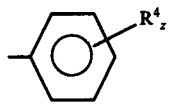

where $z$ is 0 to 3 and where $R^4$ represents lower alkyl, lower alkoxy, nitro, cyano, halo, substituted lower alkyl or substituted lower alkoxy wherein the substituents are nitro, cyano, halo or lower alkoxy and $x$ is 0 to 3.

9. A copolymer, as in claim 8, where both $OR^1$ and $OR^2$ are phenoxy or substituted phenoxy groups.

10. A copolymer, as in claim 9, where the substituted phenoxy is an alkyl or alkoxy substituted phenoxy group.

11. A copolymer, as in claim 8, where a portion of the $OR^2$ groups are replaced by W which represents a group capable of a crosslinking chemical reaction and is $-OCH=CH_2$; $-OR_5CH=CH_2$; $OC(R_6)=CH_2$ or $-OR_5CF=CF_2$ wherein $R_5$ and $R_6$ represent an aliphatic or aromatic radical, the ratio of $W:R^1+R^2$ being less than about 1:5.

12. A copolymer, as in claim 11, where W is an ethylenically unsaturated monovalent radical.

13. A method of forming a structurally regulated polyphosphazene copolymer which comprises reacting a polymer represented by the general formula

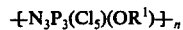

with at least about a stoichiometric equivalent of one alkali or alkaline earth metal compound of the formula

where $M$ is lithium, sodium, potassium, magnesium or calcium, $v$ is the valence of the metal $M$, where $n$ is greater than about 2 to about 600, where $R^1$ represents

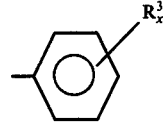

wherein $R^3$ is located in the meta or para positions on the phenoxy ring, and represents lower alkyl, lower alkoxy, halo, cyano, nitro, substituted lower alkyl or substituted lower alkoxy, and where $R^2$ and $R^1$ are different and represent lower alkyl, lower alkaryl, substituted lower alkyl or

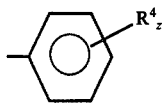

where z is 0 to 3 and were R⁴ represents lower alkyl, lower alkoxy, nitro, cyano, halo, substituted lower alkyl or substituted lower alkoxy wherein the substituents are nitro, cyano, halo, or lower alkoxy and $x$ is 0 to 3.

14. A method, as in claim 13, where both $OR^1$ and $OR^2$ are phenoxy or substituted phenoxy groups.

15. A method, as in claim 14, where the substituted phenoxy is an alkyl or alkoxy substituted phenoxy group.

16. A method of forming a structurally regulated polyphosphazene homopolymer which comprises reacting a polymer represented by the general formula $$+N_3P_3(Cl)_5)(OR^1)+_n$$

with at least about a stoichiometric equivalent of an alkali or alkaline earth metal compound of the formula $$M(OR^1)_v$$

where $M$ is lithium, sodium, potassium, magnesium, or calcium, $v$ is the valence of the metal $M$, where $n$ is greater than about 2 to about 600, and where $R^1$ represents

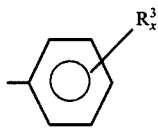

wherein $R^3$ is located in the meta or para positions on the phenoxy ring, and represents lower alkyl, lower alkoxy, halo, cyano, nitro, substituted lower alkyl or substituted lower alkoxy wherein the substituents are nitro, cyano, halo, or lower alkoxy and $x$ is 0 to 3.

17. A method, as in claim 16, where a portion of $M(OR^1)_v$ is replaced by $M(OW)_v$ where W is a group capable of a crosslinking chemical reaction and is —OCH=CH₂; —OR₅CH=CH₂; OC(R₆)=CH₂ or —OR₅CF=CF₂ wherein R₅ and R₆ represent an aliphatic or aromatic radical, the ratio of W:R¹ being less than about 1:5.

18. A foamed cellular article comprising a structurally regulated polyphosphazene copolymer represented by the general formula $$+N_3P_3(OR^1)(OR^2)_5+_n$$

where $n$ is greater than about 2 to about 600 and where $R^1$ represents

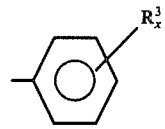

wherein $R^3$ is located in the meta or para positions on the phenoxy ring, and represents lower alkyl, lower alkoxy, halo, cyano, nitro, substituted lower alkyl or substituted lower alkoxy, and where $R^2$ and $R^1$ are different and represent lower alkyl, lower alkaryl, substituted lower alkyl or

where z is 0 to 3 and where R⁴ represents lower alkyl, lower alkoxy, nitro, cyano, halo, substituted lower alkyl or substituted lower alkoxy wherein the substituents are nitro, cyano, halo, or lower alkoxy and $x$ is 0 to 3.

19. A cellular article, as in claim 18, where both $OR^1$ and $OR^2$ are phenoxy or substituted phenoxy groups.

20. A cellular article, as in claim 18, where the substituted phenoxy is an alkyl or alkoxy substituted group.

21. A cellular article, as in claim 18, where the polyphosphazene foamed contains W which represents groups capable of a crosslinking chemical reaction and is —OCH=CH₂; —OR₅CH=CH₂; OC(R₆)=CH₂ or —OR₅CF=CF₂ wherein R₅ and R₆ represent an aliphatic or aromatic radical, the ratio of W:R¹+R² being less than about 1:5.

* * * * *